Patented July 8, 1952

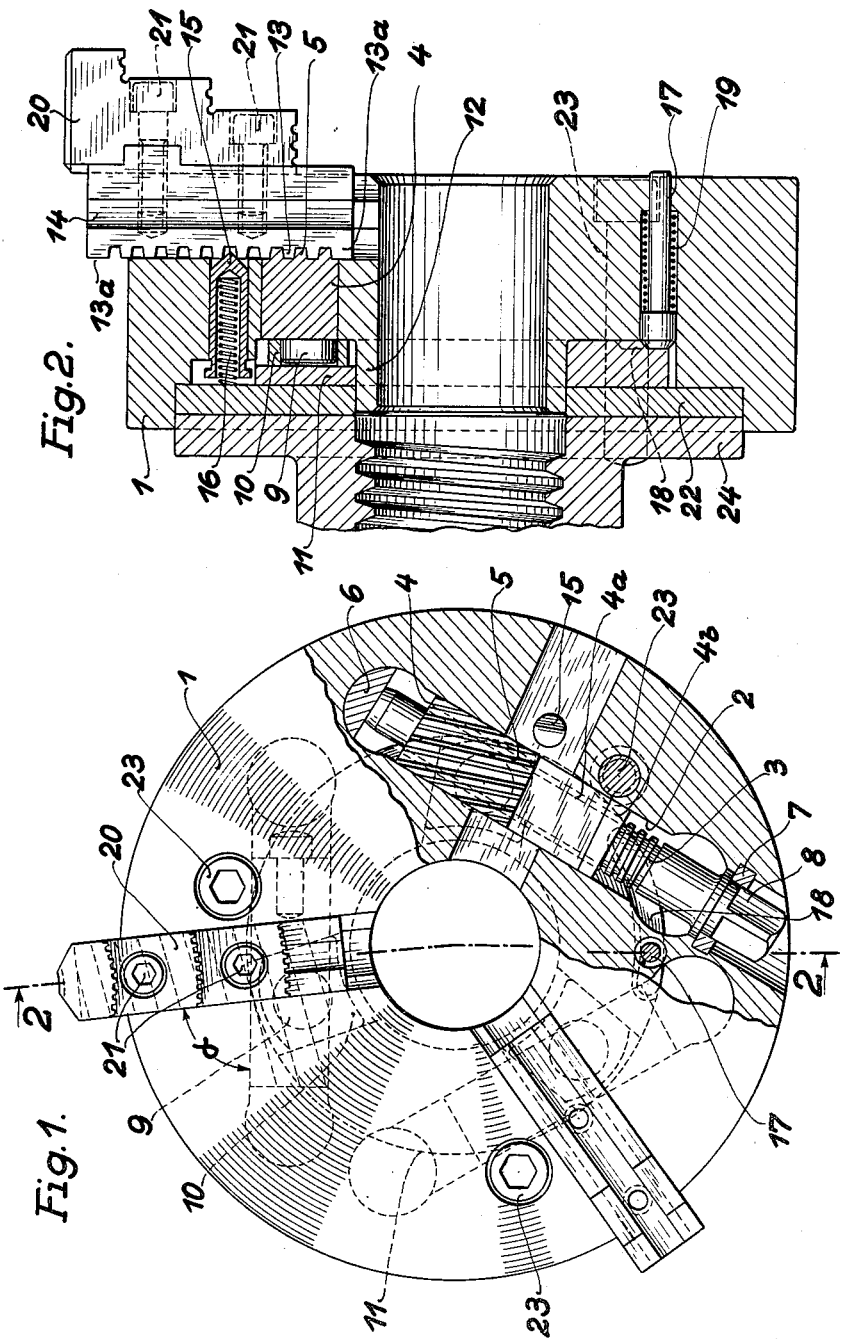

2,602,673

UNITED STATES PATENT OFFICE 2,602,673

JAW CHUCK

Karl Deuring and Franz Kreutzer,
Düsseldorf, Germany

Application December 17, 1948, Serial No. 65,844
In France January 2, 1948

8 Claims. (Cl. 279—116)

Our invention relates to jaw chucks and more particularly to selfcentring jaw chucks adapted to be used in lathes and other turning machines as well as in circular grinding and related machines. Our invention relates particularly to chucks being provided with jaws which are set moving by wedge blocks movable crosswise in relation to them.

According to our invention the link which is to secure uniform motion of the wedge blocks has the form of a driving ring arranged behind the wedge blocks and radially disposed parallel-sided slots in which stones slide for the purpose of driving pivots on the wedge blocks. This improvement allows to avoid the rack teeth and gear having been used as connecting means and to transmit forces by surfaces throughout, whereas in the known design there is a linear contact only between the rack and gear teeth. Lower specific pressures, lesser danger of deflection and breakage, increased holding power and accuracy are the results.

In the former design the strength of the gear teeth limited the smallest possible external diameter of a chuck of this type to about 7". The greater strength of the new connection together with the fact that as a gear is missing the wedge blocks can be arranged closer to the central hole of the chuck make it possible to build much smaller chucks without any part becoming too weak.

Other improvements will be seen from the following description. The drawing shows a three jaw self centring chuck incorporating the new invention. Fig. 1 is a front view, partially in section, and Fig. 2 a cross section on line A—B of Fig. 1.

The wedge blocks 4 guided in tangential grooves 2 provided in the chuck body 1 are adjustable by means of a spindle 3 and provided with straight teeth said teeth being inclined. The spindle 3 is guided in a wedge block 4 and kept in its axial direction by means of thrust bearings 6 and 7, the wedge block constituting a nut. The spindle 3 can be turned by a key fitting to the square head 8.

According to our invention each wedge block has on its rear face a pivot 9 on which a stone 10 rides. Each stone 10 slides in a radial slot provided in a driving ring 11, which is mounted on the hub 12 of the chuck 1 behind the wedge blocks 4. By turning the spindle 3 the corresponding wedge block 4 is moved in its groove, and at the same time the driving ring 11 is turned by the pivot 9 and stone 10 of the wedge block 4, and in addition, the other wedge blocks are thereby moved.

As the inclined straight teeth 5 of the wedge block 4 mesh with corresponding teeth 13 of the base jaws 14 these are radially moved when the wedge blocks are moved along their grooves.

No teeth being—as is known—provided on the forward ends 4a of the wedge blocks 4 teeth 5 and 13 are disengaged, when the wedge blocks are in the rearmost or starting position, i. e., when the threaded wedge block 4 rests against the face of thrust bearing 6. In this position each jaw 14 is held in place by a short tooth 15, or jaw holder, which is movably mounted within the chuck body 1 and pressed into the toothing 13 of jaw 14 by a spring 16 (Fig. 2). The jaw is thereby put in the correct starting position in which the teeth 5 of the wedge block 4 will readily find the spaces between the teeth 13.

By overcoming the jaw holder 15 each jaw can be shifted by hand by one or more teeth or can be pulled out of the chuck altogether. This serves to pre-set the jaws for the desired gripping diameter. Spaces of tooth are not cut to the very ends of base jaw 14 so that each end has a somewhat thicker tooth 13a. Engagement of teeth 5 and 13 is therefore made impossible unless all teeth 5 engage a space of toothing 13. It is impossible to use the chuck with but one or two teeth 5 of each wedge block being in mesh and thus to overload the teeth as would be the case when the jaws were set for gripping an extremely large diameter.

When teeth 5 and 13 are out of mesh wedge blocks 4 are in the starting position and the rib 4b which has the same height as teeth 5 remains on the other side of base jaw 14 and serves for a dirt seal preventing dirt of all kinds from getting into the interior of the chuck when the jaws are taken out of the chuck body for cleaning purposes. As in known chucks of this type jaws and wedge blocks meet at right angles there remains, for reasons of symmetry, in the end position of the wedge block, when its stands close to thrust bearing 7, a portion of the wedge block having the same width as rib 4b useless on the other side of the base jaw 14. With a view to avoid this disadvantage there is according to the present invention made the angle a between jaws and wedge blocks (see Figure 1) a little smaller and, in addition, the wedge block 4 a little shorter, so that in the aforementioned end position the teeth 5 rather do not quite cover the full width of the base jaw 14. As there is no central gear formerly used for connecting the wedge blocks with each other the grooves can be arranged closer to the center of the chuck and, consequently, made longer. Longer grooves and shorter wedge blocks result in a greater stroke of the latter and this allows at a given pitch of teeth 5 and 13 a smaller inclination angle of teeth 5 and therefore either greater gripping power or less effort for handling the key.

Between two adjacent grooves 2, preferably close to the spindle square 8, an indicating pin 17 is guided in a hole of the body 1, parallel to its axis. The pin has a shoulder and the hole is countersunk, thus making space for a compression spring 19, which forces the pin against the forward face of driving ring 11. A groove 18 in that face controls the indicating pin so that it indicates the ends of the stroke of wedge blocks 4 and also insufficient engagement between teeth 5 and 13 by projecting over the front face of the chuck body 1. In that portion of the stroke where the tooth engagement is sufficient the head of pin 17 rests in the groove and its outer end is flush with the chuck body.

Upper jaws 20 are fixed to the base jaws 14 by means of screws 21. The chuck body is closed by a cover 22. Screws 23 hold it to the adaptor plate 24 or other suitable means for connecting the chuck to the spindle of a machine.

We wish it to be understood that we do not desire to be limited to the exact details of construction shown and described, for obvious modifications will occur to a person skilled in the art.

We claim:

1. In a chuck having a plurality of clamping jaws respectively mounted for movement along radially extending paths to and from operative clamping positions and actuating wedges movable transversely of such paths for imparting radial movement to said jaws, a control ring rotatable in said chuck, each of said wedges having a pin and slot connection with said ring operative to rotate said ring in response to transverse movement thereof relative to the jaw actuated thereby, rotation of said ring by one of said connections being effective through the remaining pin and slot connections to impart equal transverse movements to the wedges connected with such remaining connections.

2. A chuck as claimed in claim 1 wherein said slots extend radially with respect to said ring and said pins extend parallel to the axis of said ring.

3. The invention defined in claim 2 characterized by each of said connections having a bearing slidable in its slot, and a pivotal connection between the bearing and pin of such connection.

4. A chuck as claimed in claim 1 wherein said slots are formed in said ring and extend radially thereof, and said pins are connected with said wedges and extend parallel to the axis of said ring.

5. The invention defined in claim 4 characterized by each of said slots having a bearing slidable therein and a pivotal connection between each of the bearings and one of said pins.

6. A chuck comprising a body having a plurality of radially extending slots therein, each of said slots having a clamping jaw slidable therein, actuating wedges movable along paths respectively extending transversely of each of said slots, and intermeshing rack-like teeth on said wedges and jaws for imparting radial movement to said jaws in response to transverse movement of said wedges, said wedges each having a path of movement inclined slightly from a position at right angles to the center line of the slots in which the jaw cooperating therewith slides to thereby enable the use of a shorter wedge than otherwise possible.

7. A chuck comprising a body having a plurality of radially extending slots therein, each of said slots having a clamping jaw slidable therein, actuating wedges movable along paths respectively extending transversely of each of said slots, and intermeshing rack-like teeth on said wedges and jaws for imparting radial movement to said jaws in response to transverse movement of said wedges, there being a greater number of teeth on said jaws than on said wedges and such teeth being inclined slightly with respect to a line normal to the path of movement of said jaws, said jaws each having an enlarged tooth at the ends thereof to prevent the teeth on said wedges meshing with a number of teeth on said jaws smaller than on said wedges.

8. In a chuck having a plurality of clamping jaws respectively mounted for movement along radially extending paths to and from operative clamping positions and actuating wedges movable transversely of such paths for imparting radial movement to said jaws, a control ring rotatable in said chuck, each of said wedges having a connection with said control ring such that a transverse movement of one of the wedges will impart through said ring equal transverse movements to the remaining wedges, an indicator for indicating the relative position of said wedges with respect to said jaws, and means actuated by rotational movement of said ring for operating said indicator.

KARL DEURING.
FRANZ KREUTZER.

REFERENCES CITED

The following references are of record in the file of this patent:

UNITED STATES PATENTS

| Number | Name | Date |
| --- | --- | --- |
| 295,230 | Colton | Mar. 18, 1894 |
| 1,082,590 | Hartness | Dec. 30, 1913 |
| 2,275,828 | Sloan et al. | Mar. 10, 1942 |

FOREIGN PATENTS

| Number | Country | Date |
| --- | --- | --- |
| 340,335 | Germany | Nov. 9, 1920 |
| 675,489 | France | Nov. 7, 1929 |